(12) United States Patent
Manabe

(10) Patent No.: US 10,267,647 B2
(45) Date of Patent: Apr. 23, 2019

(54) INFORMATION PROCESSING DEVICE, TRAVELING DIRECTION ESTIMATION METHOD AND STORAGE MEDIUM

(71) Applicant: CASIO COMPUTER CO., LTD., Tokyo (JP)

(72) Inventor: Yoshitsugu Manabe, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 584 days.

(21) Appl. No.: 14/830,390

(22) Filed: Aug. 19, 2015

(65) Prior Publication Data

US 2016/0054129 A1 Feb. 25, 2016

(30) Foreign Application Priority Data

Aug. 22, 2014 (JP) .................. 2014-169368

(51) Int. Cl.
*G06F 19/00* (2018.01)
*G01C 22/00* (2006.01)

(52) U.S. Cl.
CPC .................. *G01C 22/006* (2013.01)

(58) Field of Classification Search
CPC ............. A61B 5/0002; A61B 5/02416; A61B 5/02427

USPC .................. 702/150, 182–185, 188, 141
See application file for complete search history.

(56) References Cited

U.S. PATENT DOCUMENTS 8,935,119 B2 * 1/2015 Yuen .................. G01B 21/16
702/138
2014/0088867 A1 3/2014 Takaoka

FOREIGN PATENT DOCUMENTS

JP 2012-242179 A 12/2012

* cited by examiner

*Primary Examiner* — Edward Raymond
(74) *Attorney, Agent, or Firm* — Fitch, Even, Tabin & Flannery LLP

(57) ABSTRACT

An information processing device acquires acceleration generated by movement of a user, and estimates that the movement of the user is walking or running based on this acquired acceleration. In addition, traveling direction estimation methods for estimating the traveling direction of the user are switched between, based on the estimation results for the movement of the user, and the traveling direction of the user is estimated by way of this selected traveling direction estimation method.

13 Claims, 5 Drawing Sheets

INFORMATION PROCESSING DEVICE, TRAVELING DIRECTION ESTIMATION METHOD AND STORAGE MEDIUM

CROSS-REFERENCE TO RELATED APPLICATION

This application is based upon and claims the benefit of priority from the prior Japanese Patent Application No. 2014-169368, filed Aug. 22, 2014, and the entire contents of which are incorporated herein by reference.

BACKGROUND OF THE INVENTION

Field of the Invention

The present invention relates to an information processing device, a traveling direction estimation method and a storage medium.

Related Art

Conventionally, in order to autonomously estimate the current position of a user, technology has been known for estimating the traveling azimuth of a user based on the output of an acceleration sensor provided in a device carried by a user that is walking (e.g., Japanese Unexamined Patent Application, Publication No. 2012-242179).

According to this system, the traveling azimuth of the user is calculated based on the direction of acceleration detected by the acceleration sensor and the azimuth detected by a geomagnetic sensor. The direction of acceleration used herein is a forward direction or backward direction relative to the orientation of the body of the user, i.e. basically the direction of the horizontal component of acceleration.

However, the direction of acceleration cannot be determined from only this horizontal component of acceleration.

This is because, every time the user takes a step forward by walking, only the horizontal component of acceleration, which changes alternately between the position direction and negative direction, is detected from an acceleration sensor, and further, for this horizontal component, the form of output differs according to in which direction this device is facing and carried by the user relative to the orientation of the body. For example, with a case of carrying so that the forward direction of the body of the user and the positive direction of the horizontal component of acceleration match, and a case of carrying so as to conversely match with the negative direction of the horizontal component, the horizontal component of acceleration detected will have the opposite positive/negative directions.

In this way, it is not possible to determine from only this horizontal component of acceleration whether the user is advancing forwards relative to the orientation of the body or advancing backwards.

Therefore, in Japanese Unexamined Patent Application, Publication No. 2012-242179, a method is being used that detects not only the horizontal component of acceleration, but also the vertical component, and detects in either of forwards or backwards of the user is advancing, based on the relationship of timings at which both of these components become peaks in the positive direction or negative direction.

However, it is known that, when the walking speed becomes high, i.e. when the user becomes running state, the relationship of timings at which the horizontal component and vertical component of acceleration each reach peaks will change.

However, the technology described in Japanese Unexamined Patent Application, Publication No. 2012-242179 persistently estimates the traveling direction on the premise that the user is walking.

For this reason, when the user becomes running state, the possibility for error arising in the estimation of traveling direction is high.

In other words, in the conventional technology, a situation has been brought about in which it becomes difficult to estimate the traveling direction of the forwards direction or backwards direction accurately, depending on the movement situation of the user, and accurate calculation of the traveling azimuth of the user and thus the current position thereby becomes difficult.

SUMMARY OF THE INVENTION

The present invention has been made taking such a situation into account, and has an object of estimating the traveling direction of a user more accurately, even if there is a change in the movement situation of the user.

In order to achieve the above-mentioned object, an information processing device according to an aspect of the present invention includes:

an acceleration sensor that detects acceleration generated by movement of a user; and a processing unit that executes: movement estimation processing to estimate whether the movement of the user is walking or running based on acceleration detected by the acceleration sensor; estimation method selection processing to select one from among a plurality of direction estimation methods for estimating a traveling direction that indicates traveling in a forward direction or backward direction relative to an orientation of a body of the user, based on estimation results by way of the movement estimation processing; and direction estimation processing to estimate the traveling direction of the user by way of the direction estimation method selected according to the estimation method selection processing.

DETAILED DESCRIPTION OF THE INVENTION

Hereinafter, embodiments of the present invention will be explained while referencing the drawings.

(Hardware Configuration)

Figure 1:
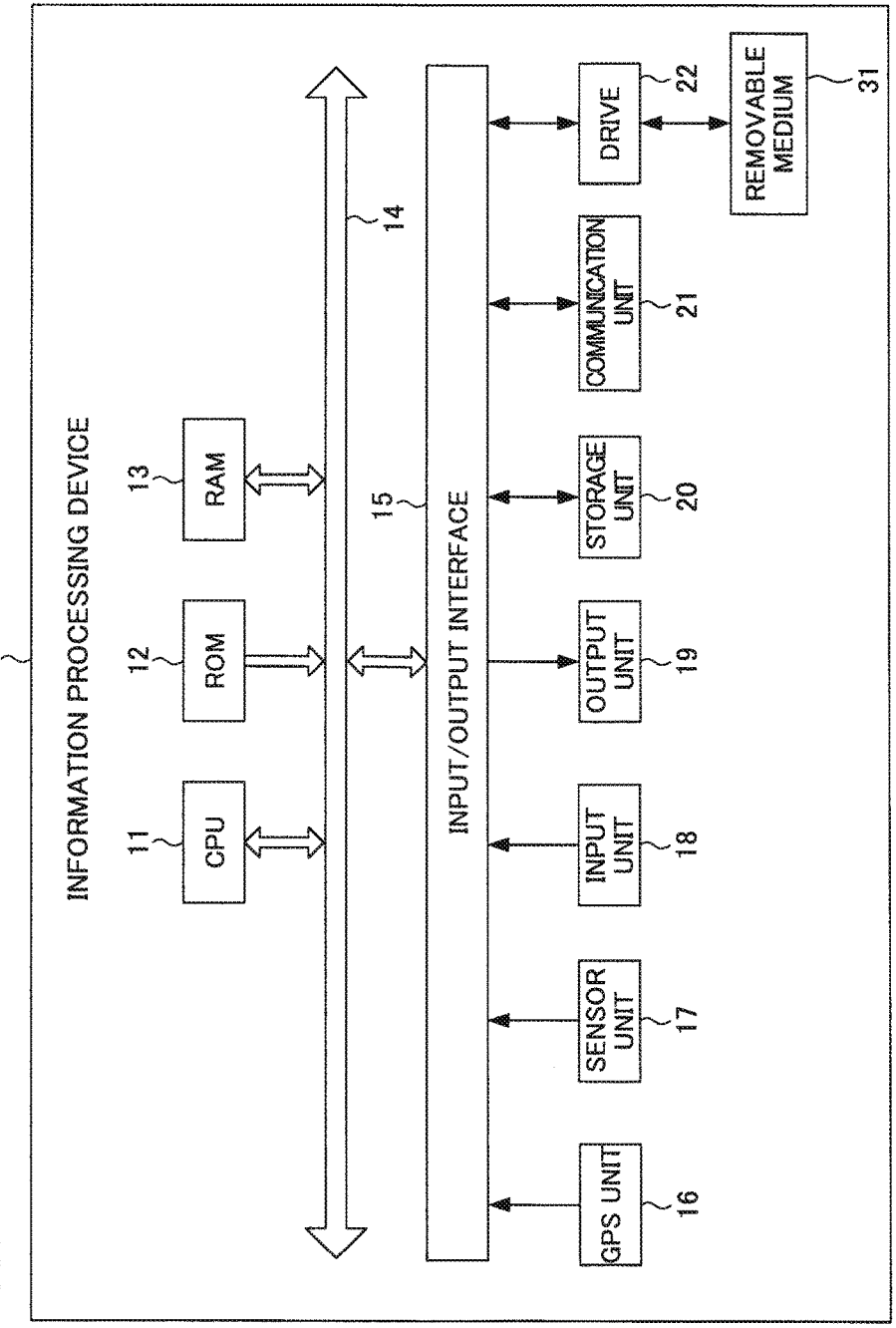
FIG. 1 is a block diagram showing the hardware configuration of an information processing device according to an embodiment of the present invention.

FIG. 1 is a block diagram showing the hardware configuration of an information processing device 1 according to an embodiment of the present invention.

The information processing device 1 is configured as a smartphone, for example, and is worn at a region close to the torso such as the waist during use.

The information processing device 1 includes a CPU (Central Processing Unit) 11, ROM (Read Only Memory) 12, RAM (Random Access Memory) 13, a bus 14, an input/output interface 15, a GPS (Global Positioning System) unit 16, a sensor unit 17, and input unit 18, an output unit 19, a storage unit 20, a communication unit 21 and a drive 22.

The CPU 11 executes various processing in accordance with a program recorded in the ROM 12, or a program loaded from the storage unit 20 into the RAM 13. For example, the CPU 11 executes traveling direction estimation processing in accordance with a program for traveling direction estimation processing described later.

Data, etc. required upon the CPU 11 executing the various processing is stored in the RAM 13 as appropriate.

The CPU 11, ROM 12 and RAM 13 are connected to each other via the bus 14. In addition, the input/output interface 15 is also connected to this bus 14. The GPS unit 16, sensor unit 17, input unit 18, output unit 19, storage unit 20, communication unit 21 and drive 22 are connected to the input/output interface 15.

The GPS unit 16 includes an antenna, and acquires positional information of the information processing device 1 by receiving GPS signals sent from a plurality of GPS satellites.

The sensor unit 17 includes various sensors such as a three-axis acceleration sensor and a geomagnetic sensor.

The input unit 18 is configured by various buttons, etc. and inputs various information in response to the instruction operations of the user.

The output unit 19 is configured by a display, a speaker, etc., and outputs images and sound.

The storage unit 20 is configured by a hard disk, DRAM (Dynamic Random Access Memory) or the like, and stores the data of various images.

The communication unit 21 controls communication to be performed with another device (not illustrated) via a network including the Internet.

Removable medium 31 made from a magnetic disk, optical disk, magneto-optical disk, semiconductor memory or the like is installed as appropriate in the drive 22. A program read from the removable medium 31 by the drive 22 is installed in the storage unit 20 as necessary. In addition, similarly to the storage unit 20, the removable medium 31 can store various data such as the data of images stored in the storage unit 20.

(Functional Configuration)

Next, the functional configuration for executing the traveling direction estimation processing, among the functional configurations of the information processing device 1, will be explained by referencing FIG. 2.

Figure 2:
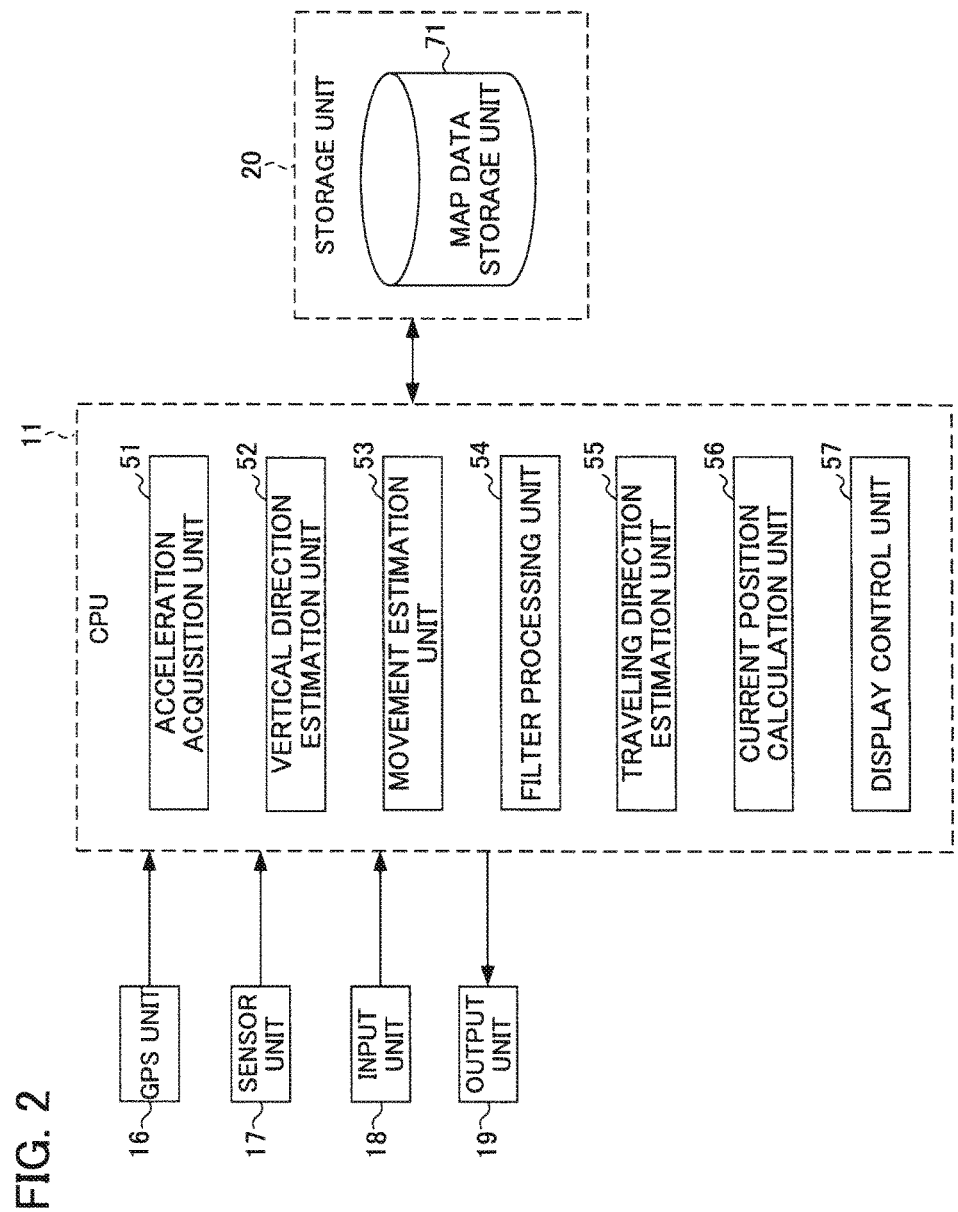
FIG. 2 is a functional block diagram showing the functional configuration for executing traveling direction estimation processing, among the functional configurations of the information processing device in FIG. 1.

FIG. 2 is a functional block diagram showing the functional configuration for executing the traveling direction estimation processing, among the functional configurations of such an information processing device 1 of FIG. 1.

Traveling direction estimation processing refers to a series of processing that estimates the traveling direction of a user wearing the information processing device 1, based on the input signals from sensors, and then displays the current position on a map.

In the case of the traveling direction estimation processing being executed, as shown in FIG. 2, an acceleration acquisition unit 51, vertical direction estimation unit 52, movement estimation unit 53, filter processing unit 54, traveling direction estimation unit 55, current position calculation unit 56 and display control unit 57 function in the CPU 11.

In addition, a map data storage unit 71 is established in a region of the storage unit 20.

Data of maps to be displayed in the traveling direction estimation processing is stored in the map data storage unit 71.

The acceleration acquisition unit 51 acquires acceleration data from the sensor unit 17 every predetermined time period (e.g., every 0.2 seconds).

The vertical direction estimation unit 52 calculates a vertical direction vector based on the acceleration data acquired by the acceleration acquisition unit 51.

More specifically, the vertical direction estimation unit 52 calculates the vertical direction vector by way of calculating the average value for the pre-set time period (e.g., 4 seconds, etc.) of the acceleration data (vertical component) acquired by the acceleration acquisition unit 51.

The movement estimation unit 53 performs determination of whether the movement of the user being estimated is walking or running, based on the acceleration data.

It should be noted that, in the case of a person running, both legs of the user will be separated from the ground surface at the same time, and in the case of a person walking, both legs of the user will not be separated from the ground surface at the same time; therefore, "walking" and "running" in the present embodiment are distinguished by such a viewpoint.

More specifically, the movement estimation unit 53 determines that the user is running in the case of, for the respective accelerations acquired for the vertical direction and front-back direction, the magnitude of each acceleration being at least an acceleration threshold for a running determination, and the pitch indicated by the peaks of each acceleration (time interval of peaks) being no more than a pitch threshold for a running determination. On the other hand, the movement estimation unit 53 determines that the user is walking in the case of the magnitude of each acceleration being less than the acceleration threshold for a running determination, or the pitch indicated by the peaks of each acceleration being less than the pitch for a running determination. Herein, the acceleration threshold and pitch threshold for running determination related to the acceleration in the vertical direction and front-back direction can be set based on experimental values or simulation values.

Figure 3A:
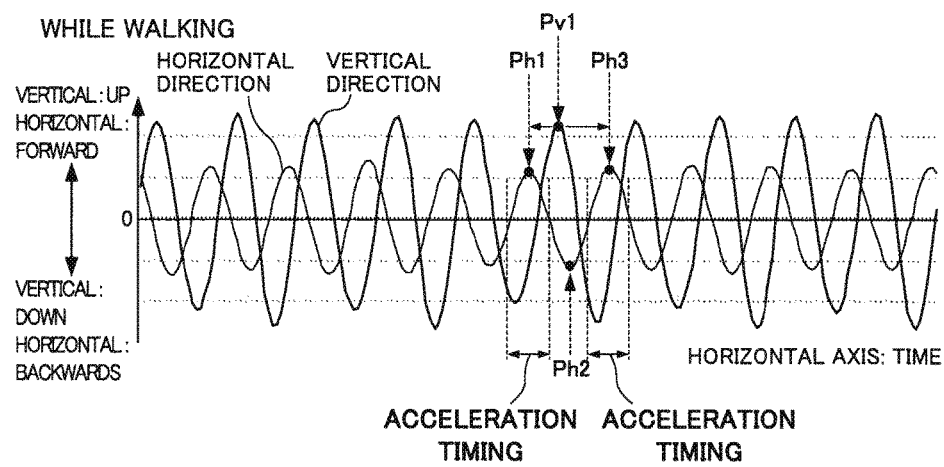
FIGS. 3A and 3B provide pattern diagrams showing the corresponding relationship between time (horizontal axis) and the acceleration (vertical axis) in the vertical direction and front-back direction for the movement of the user, with FIG. 3A being a graph showing the corresponding relationship between acceleration and time while walking, and FIG. 3B being a graph showing the corresponding relationship between acceleration and time while running.
Figure 3B:
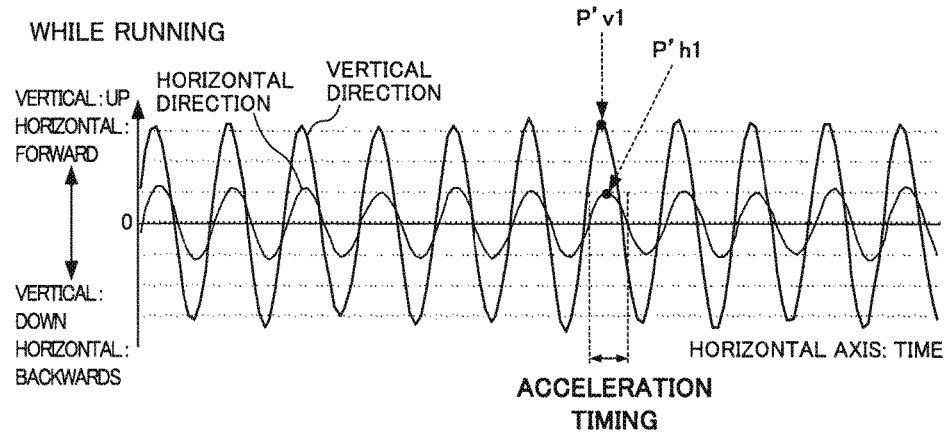

Depending on the estimation result of movement of the user by the movement estimation unit 53 (walking or running), the estimation method for the traveling direction of the user is switched in the traveling direction estimation unit 55 (refer to FIG. 3A and FIG. 3B)

The filter processing unit 54 executes, on the acceleration data acquired by the acceleration acquisition unit 51, filter processing according to the movement of the user estimated in the movement estimation unit 53.

More specifically, in the case of the movement of the user estimated in the movement estimation unit 53 being walking, the filter processing unit 54 executes processing by way of a band-pass filter (band-pass filter for walking) that allows a frequency band of a predetermined range centered around 2.0 Hz to pass, on the acquired acceleration data (horizontal component). In the case of the movement of the user estimated in the movement estimation unit 53 being running, the filter processing unit 54 executes processing according to a band-pass filter (band-pass filter for running) that allows a frequency band of a predetermined range centered around 3.0 Hz to pass, on the acquired acceleration data (horizontal component).

The traveling direction estimation unit 55, for every movement of the user (i.e. walking or running), estimates the traveling direction from the relationship between the timing of the extreme value of the vertical direction vector (peak) and the acceleration timing, by way of a different traveling direction estimation method (traveling direction estimation method for during walking or traveling direction estimation method for during running), based on the vertical direction vector calculated by the vertical direction estimation unit 52 and the acceleration data subjected to the filter processing by the filter processing unit 54.

More specifically, in the case of the movement estimation unit 53 determining the movement of the user as being walking, the traveling direction estimation unit 55 estimates as being forward the direction of the extreme value of acceleration data (horizontal component) the second nearest in a future direction on the time axis (or nearest in the past direction on the time axis), relative to a timing at which the vertical direction vector indicates an upward extreme value (peak). On the other hand, in the case of the movement estimation unit 53 determining the movement of the user as being running, the traveling direction estimation unit 55 estimates the direction of the extreme value of the acceleration data (horizontal component) belonging to the time period of the same half-cycle as forward, relative to the timing at which the vertical direction vector indicates an upward extreme value (peak).

Herein, the estimation method of the traveling direction in the traveling direction estimation unit 55 will be explained while referencing FIGS. 3A and 3B. It should be noted that the estimation method of the traveling direction shown in FIGS. 3A and 3B can be generalized by excluding individual differences, since it is based on the basic physical structure of a human being.

FIGS. 3A and 3B are schematic views showing the corresponding relationship between accelerations in the vertical direction and front-back direction for the movement of a user (vertical axis) and time (horizontal axis), with FIG. 3A being a graph showing the corresponding relationship between acceleration while walking and time, and FIG. 3B being a graph showing the corresponding relationship between acceleration while running and time.

FIGS. 3A and 3B, the positive side of the vertical axis corresponds to upwards in the vertical direction and forwards in the front-back direction, and the negative side of the vertical axis corresponds to downwards in the vertical direction and rearwards in the front-back direction. It should be noted that the relationship of the positive side and negative side of the vertical axis with forwards and rearwards in the front-back direction is decided by the traveling direction traveled by the traveling direction estimation unit 55, and in the case of the traveling direction of the user changing, forward and rearward in the front-back direction will successively change places in relation to the positive side and negative side of the vertical axis.

Figure 4A:
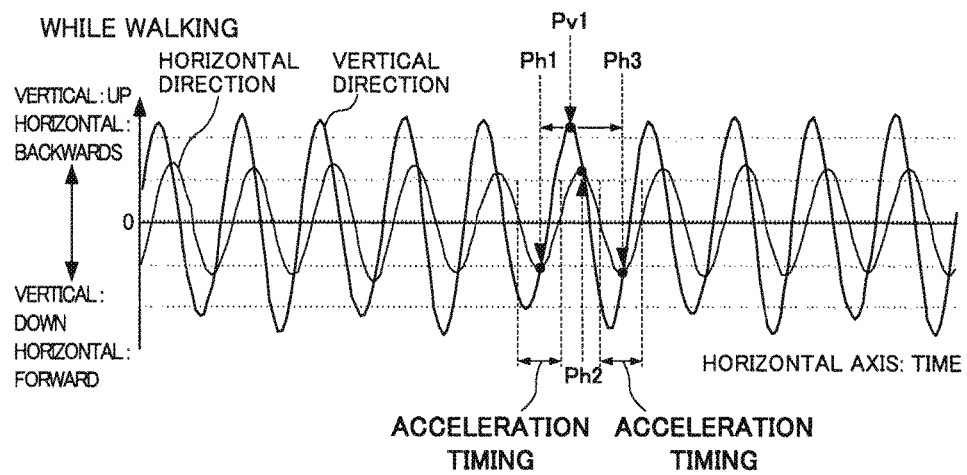
FIG. 4A provides graphs showing the corresponding relationship between acceleration and time in the case of the traveling direction of the user changing while walking, and similarly.
Figure 4B:
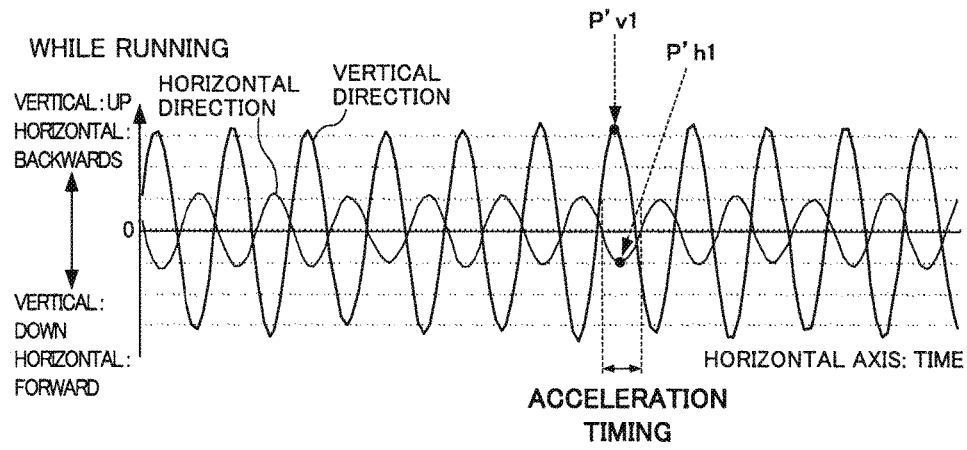
FIG. 4B is a graph showing the corresponding relationship between acceleration and time in the case of the traveling direction of the user changing while running.

FIG. 4A is a graph showing the corresponding relationship between acceleration and time in the case of the traveling direction of the user changing while walking, and similarly, FIG. 4B is a graph showing the corresponding relationship between acceleration and time in the case of the traveling direction of the user changing while running.

As shown in FIG. 3A, in the future direction (right direction) on the time axis relative to the timing indicating the extreme value Pv1 in the upward direction for the acceleration in the vertical direction, the direction of the extreme value Ph3 for acceleration in the horizontal direction that is the second closest (positive side of vertical axis) after the extreme value Ph2 for acceleration is estimated as forward of the traveling direction while walking.

In addition, as shown in FIG. 3B, relative to the timing indicating the extreme value P'v1 in the upward direction for the acceleration in the vertical direction, the direction of the extreme value P'h1 of acceleration in the horizontal direction that belongs to the time period of the same half-cycle (positive side of vertical axis) is estimated as forward of the traveling direction while running.

In this way, in the present embodiment, the estimation method of the traveling direction is switched depending on the movement of the user estimated by the movement estimation unit 53 (i.e. whether being walking or running).

For this reason, in the case of using a single method as the estimation method of the traveling direction, appropriately estimating the traveling direction by the movement of the user becomes difficult according to the movement of the user; however, with the information processing device of the present embodiment, it becomes possible to appropriately estimate the traveling direction irrespective of the movement of the user.

Referring back to FIG. 2, the current position calculation unit 56 calculates the current position from the data of acceleration in the horizontal direction, depending on the estimation results of the traveling direction. The current position is thereby autonomously calculated without employing a positioning system such as GPS.

The display control unit 57 references the data of maps stored in the map data storage unit 71, and displays the current position calculated by the current position calculation unit 56 on a map.

(Operation)

Next, operation will be explained.

Figure 5:
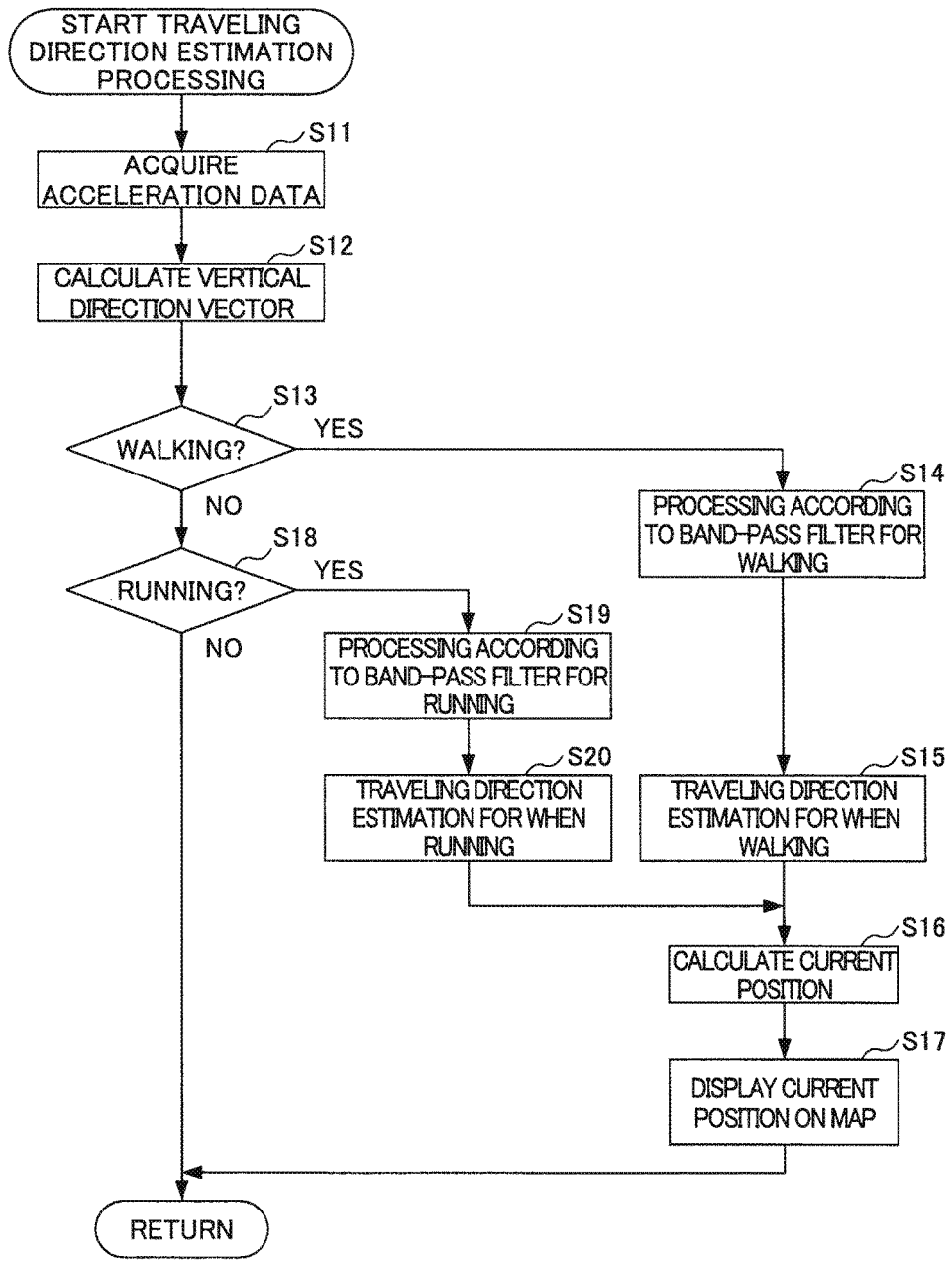
FIG. 5 is a flowchart illustrating the flow of traveling direction estimation processing executed by the information processing device of FIG. 1 having the functional configuration of FIG. 2.

FIG. 5 is a flowchart illustrating the flow of traveling direction estimation processing executed by the information processing device 1 of FIG. 1 having the functional configuration of FIG. 2.

The traveling direction estimation processing is started in the case of not being able to receive a GPS signal at the GPS unit 16 after a predetermined time, and is repeatedly executed until it becomes possible to receive a GPS signal at the GPS unit 16.

In Step S11, the acceleration acquisition unit 51 acquires acceleration data from the sensor unit 17 every predetermined time period (e.g., every 0.2 seconds).

In Step S12, in the acceleration data (vertical component) acquired by the acceleration acquisition unit 51, the vertical direction vector is calculated by calculating the average value of a pre-set time (e.g., 4 seconds, etc.).

In Step S13, the movement estimation unit 53 performs determination of whether the movement of the user to be estimated is walking, based on the acceleration data. More specifically, the movement estimation unit 53 determines that the user is walking in the case of the magnitude of each acceleration acquired in Step S11 being less than an acceleration threshold for running determination, or the pitch indicated by the peaks (extreme value) of each acceleration being less than a pitch threshold for running determination.

In the case of the movement of the user being walking, it is determined as YES in Step S13, and the processing advances to Step S14.

On the other hand, in the case of the movement of the user not being walking, it is determined as NO in Step S13, and the processing advances to Step S18.

In Step S14, the filter processing unit 54 executes processing according to a band-pass filter (band-pass filter for walking) that allows a frequency band of a predetermined range centered around 2.0 Hz to pass, on the acceleration data (horizontal component) acquired in Step S11.

In Step S15, the traveling direction estimation unit 55 estimates as forward the direction of the extreme value of the acceleration data (horizontal component) that is the second closest in the future direction on the time axis (or closest in the past direction on the time axis), relative to the timing at which the vertical direction vector specified in Step S12 indicates an extreme value (peak) in the upward direction. In other words, the traveling direction estimation unit 55 executes the traveling direction estimation method for when walking.

In Step S16, the current position calculation unit 56 obtains the traveling azimuth of the user traveling, i.e. traveling azimuth, according to the estimation results of the traveling direction in Step S15 and the azimuth obtained from the geomagnetic sensor of the sensor unit 17. Then, the current position is further calculated from this traveling azimuth and data of acceleration in the horizontal direction.

In Step S17, the display control unit 57 references the data of maps stored in the map data storage unit 71, and displays the current position calculated by the current position calculation unit 56 on a map.

After Step S17, the traveling direction estimation processing is repeated until an end condition is fulfilled.

In Step S18, the movement estimation unit 53 performs determination of whether the movement of the user is running based on the acceleration data. More specifically, the movement estimation unit 53 determines that the user is running in the case of, for the respective accelerations in the vertical direction and front-back direction acquired in Step S11, the magnitude of each acceleration being at least an acceleration threshold for running determination, and the pitch indicated by the peaks of each acceleration (time interval of peaks) being no more than a pitch threshold for running determination.

In the case of the movement of the user being running, it is determined as YES in Step S18, and the processing advances to Step S19.

On the other hand, in the case of the movement of the user not being running, it is determined as NO in Step S18, and the traveling direction estimation processing is repeated.

In Step S19, the filter processing unit 54 executes processing according to a band-pass filter (band-pass filter for running) that allows a frequency band of a predetermined range centered around 3.0 Hz to pass, on the acceleration data (horizontal component) acquired in Step S11.

In Step S20, the traveling direction estimation unit 55 estimates as forward the direction of the extreme value in the acceleration data (horizontal component) belonging to a time period of the same half-cycle, relative to the timing at which the vertical direction vector specified in Step S12 indicates an extreme value (peak) in the upward direction. In other words, the traveling direction estimation unit 55 executes the traveling direction estimation method for when running.

After Step S20, the processing advances to Step S16.

The information processing device 1 configured as above includes the sensor unit 17 and the CPU 11 including the movement estimation unit 53 and traveling direction estimation unit 55.

The sensor unit 17 detects acceleration occurring by the movement of the user.

The movement estimation unit 53 executes the movement estimation processing to estimate whether the movement of the user is walking or running, based on the acceleration detected by the sensor unit 17.

The traveling direction estimation unit 55 executes estimation method selection processing to select one from among the plurality of direction estimation methods for estimating the traveling direction indicating whether traveling in a forward direction or backward direction relative to the orientation of the body of the user, based on the estimation results by the movement estimation processing, and executes direction estimation processing to estimate the traveling direction of the user according to the direction estimation method selected by way of the estimation method selection processing.

The direction estimation method for estimating the traveling direction of the user thereby switches in the case of the user walking and the case of the user running.

Therefore, it is possible to estimate the traveling direction more accurately depending on the movement situation of the user.

In addition, the sensor unit 17 detects acceleration of the vertical direction component and horizontal direction component relative to the sensor unit 17 main body.

It is thereby possible to detect acceleration that is useful in appropriately estimating walking and running of the user.

In addition, the movement estimation unit 53 executes, as the movement estimation processing, processing that estimates that the user is running in the case of, for respective accelerations of the vertical direction component and horizontal direction component detected, the magnitude of the respective accelerations being at least an acceleration threshold for running determination, and the pitch indicated by the time interval between the peaks of each of the accelerations being no more than a pitch threshold for running determination; and that estimates that the user is walking in the case of the magnitudes of the respective accelerations of the vertical direction component and the horizontal direction component being less than the acceleration threshold for running determination, or the pitch indicated by the time interval between peaks of each of the accelerations being less than the pitch threshold for running determination.

It is thereby possible to estimate the traveling direction more accurately to appropriately correspond to the movement situation of the user.

In addition, the traveling direction estimation unit 55 executes, as the direction estimation processing, processing that estimates as being the traveling direction of the user a direction indicated by the extreme value that is second closest in the future direction on the time axis, or closest in the past direction on the time axis, among the extreme values of the horizontal direction component of acceleration detected by the sensor unit 17, relative to the timing indicating the extreme value of acceleration in the upward direction for the vertical direction component of acceleration detected by the sensor unit 17, in the case of estimating that the movement of the user is walking by way of the movement estimation processing; and estimates as being the traveling direction of the user a direction indicated by an extreme value belonging to the time period of the same half-cycle as the extreme value in the upward direction for the vertical component of acceleration, among the extreme values for the horizontal component of acceleration acquired by way of the sensor unit 17 as the traveling direction of the user, relative to a timing indicating an extreme value of acceleration in the upward direction for the vertical direction component of acceleration detected by the sensor unit 17.

It is thereby possible to appropriately estimate the traveling direction by referencing the detection results of the acceleration sensor.

In addition, the information processing device 1 further includes the filter processing unit 54 in the CPU 11.

In the case of being estimated that the movement of the user is walking by way of the movement estimation processing, the filter processing unit 54 executes filtering for walking that allows a frequency band corresponding to when walking to pass, on the waveform of acceleration acquired by the sensor unit 17.

In addition, in the case of being estimated that the movement of the user is running by way of the movement estimation processing, the filter processing unit 54 executes filter processing for running that allows a frequency band corresponding to when running to pass, on the waveform of acceleration acquired by the sensor unit 17.

In the movement estimation processing, it is estimated whether the movement of the user is walking or running, based on the waveform of acceleration after filter processing for walking or filter processing for running execution.

Since it is thereby possible to execute filter processing according to whether the movement of the user is walking or running on the waveform of acceleration acquired, the noise in the waveform of acceleration is removed, whereby it becomes possible to estimate the traveling direction more accurately.

In addition, in the movement estimation processing, filter processing for walking that allows a frequency band corresponding to when walking to pass and filter processing for running that allows a frequency band corresponding when running to pass are executed on the waveform of acceleration detected by the sensor unit 17, and in the processing results of the filter processing for walking and filter processing for running, the movement corresponding to the filter for which the extreme values are clearer is estimated as the movement of the user.

Since it is thereby possible to estimate whether the movement of the user is walking or running from the waveform of acceleration used in the estimation of the traveling direction, it becomes possible to perform estimation of the movement of the user having high consistency with the estimation results for the traveling direction.

In addition, in the movement estimation processing, based on the estimation results of the movement of the user, it switches to either of a first traveling direction estimation method in which the relation between the peaks of a component in the vertical direction and the peaks of a component in the horizontal direction of acceleration acquired by the sensor unit 17 corresponds to when walking, and a second traveling direction estimation method in which this relation corresponds to when running.

In the traveling direction estimation processing, the traveling direction of the user is estimated by way of the first traveling direction estimation method or the second traveling direction estimation method that was selected by way of the movement estimation processing.

Using the traveling direction estimation method that better suits the movement of the user, it is possible to estimate the traveling direction of the user from the relation of the component in the vertical direction and the component in the horizontal direction of acceleration.

Therefore, it is possible to estimate the traveling direction more accurately according to the movement situation of the user.

In addition, the filter processing unit 54 executes common filter processing that allows the frequency band corresponding to when walking and the frequency band corresponding to when running to pass, on the waveform of acceleration acquired by the sensor unit 17.

In the movement estimation processing, it is estimated that the movement of the user is walking or running based on the waveform of the acceleration after executing the common filter processing.

By preparing one filter that corresponds to when walking and when running, it thereby becomes possible to estimate the traveling direction more accurately by suppressing a constant noise in the waveform of acceleration.

In addition, the information processing device 1 includes the current position calculation unit 56 in the CPU 11.

The current position calculation unit 56 executes current position calculation processing that calculates the current position based on the estimation results of the traveling direction according to the direction estimation processing, and the horizontal direction of acceleration detected.

It is thereby possible to calculate a more accurate current position based on the traveling direction that was appropriately estimated.

In addition, the information processing device 1 includes the map data storage unit 71 and display control unit 57, which is in the CPU 11.

The map data storage unit 71 stores map data.

The display control unit 57 executes display control processing that references the map data stored in the map data storage unit 71 and displays a map on the display unit 19, as well as displaying the current position calculated by way of the current position calculation processing on the map thus displayed.

It is thereby possible to display a more accurate current position.

In addition, the information processing device 1 includes the vertical direction estimation unit 52 in the CPU 11.

For the vertical direction component of acceleration detected by the sensor unit 17, the vertical direction estimation unit 52 executes vertical direction estimation processing that calculates the average value for the vertical direction component of acceleration calculated by the sensor unit 17, for a pre-set time period.

It is thereby possible to more accurately estimate the vertical direction.

It should be noted that the present invention is not to be limited to the aforementioned embodiment, and that modifications, improvements, etc. within a scope that can achieve the objects of the present invention are included in the present invention.

In the aforementioned embodiment, the filter processing unit 54 of the information processing device 1 performs band-pass filter processing according to different frequency bands depending on whether the movement of the user is walking or running; however, it is not limited thereto.

For example, the band-pass filter processing of the filter processing unit 54 may establish a band setting (e.g., frequency band of a predetermined range centered around 2.5 Hz) such that the accelerations of either of the case of the movement of the user being walking and the case of being running are allowed to pass. In other words, the filter processing unit 54 may perform band-pass filter processing by way of a common filter for walking and for running.

It should be noted that the frequency band of the band-pass filter processing by the filter processing unit 54 described in the aforementioned embodiment is merely an exemplification, and it is possible to appropriate set a band that can suitably extract the acceleration for walking or running.

In addition, in the aforementioned embodiment, it is configured so that the movement estimation unit 53 estimates whether the movement of the user is walking or running based on the magnitude of acceleration and the interval between peaks of acceleration; however, it is not limited thereto.

For example, it is possible for the processing by the band-pass filter for walking and the band-pass filter for running to be performed on the waveform of acceleration by the filter processing unit 54, and the movement estimation unit 53 to estimate the movement corresponding to the filter for which the peaks of the waveform are more clearly represented as the movement of the user.

Since it is thereby possible to estimate whether the movement of the user is walking or running from the waveform of acceleration that is used in the estimation of the traveling direction, it becomes possible to perform estimation of the movement of the user having high consistency with the estimation results for the traveling direction.

In addition, although the movement estimation unit 53 estimates whether the movement of the user is walking or running in the aforementioned embodiment, it may estimate movement other than walking and running, such as a state of riding on a bicycle.

In addition, although the traveling direction estimation processing is configured to be executed in the case of not being able to receive a GPS signal in the aforementioned embodiment, it is not limited thereto. In other words, it may perform in conjunction with traveling direction estimation processing also in the case of being able to receive a GPS signal, and then adopt the traveling direction that is more reliable, among the traveling direction based on the GPS signal and the traveling direction based on the traveling direction estimation processing.

In addition, although the information processing device 1 to which the present invention is applied is explained with the example of a smartphone in the aforementioned embodiment, it is not particularly limited thereto.

For example, the present invention can be applied to general electronic devices including an acceleration sensor that can be worn close to the body torso. More specifically, for example, the present invention is applicable to a pedometer, wearable terminal device, portable navigation device, mobile telephone, portable game console, and the like.

The aforementioned series of processing can be implemented by hardware, and can be implemented by software.

In other words, the functional configuration of FIG. 2 is merely an exemplification, and it is not particularly limited thereto. More specifically, it is sufficient so long as a function enabling the aforementioned series of processing to be executed as a whole to be equipped to the information processing device 1, and what types of functional blocks are used in order to realize this function are not particularly limited to the example of FIG. 2.

In addition, one functional block may be configured by a unit of hardware, may be configured by a unit of software, or may be configured by a combination thereof.

In the case of having the series of processing executed by software, a program constituting this software is installed from a network or recording medium to a computer or the like.

The computer may be a computer built into dedicated hardware. In addition, the computer may be a computer capable of executing various functions by installing various programs, e.g., a general-purpose personal computer.

The storage medium containing such a program not only can be constituted by the removable medium 31 shown in FIG. 2 which is distributed separately from the device main body in order to supply the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), a Blu-ray (registered trademark) disk (Blu-ray Disk) or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present disclosure, the steps describing the program recorded in the storage medium include not only the processing executed in a time series following this order, but also processing executed in parallel or individually, which is not necessarily executed in a time series.

In addition, the terminology of system in the present disclosure is to indicate the entire device constituted by a plurality of devices, a plurality of means, or the like.

Although some embodiments of the present invention have been described above, the embodiments are merely exemplifications, and are not to limit the technical scope of the present invention. Various other embodiments can be assumed for the present invention, and various modifications such as omissions and replacements are possible without departing from the spirit of the present invention. Such embodiments and modifications are included in the scope of the invention and the summary described in the present disclosure, and are included in the invention recited in the claims as well as the equivalent scope thereof.

What is claimed is:

1. An information processing device comprising:
an acceleration sensor that detects acceleration generated by movement of a user; and
a processing unit that executes: movement estimation processing to estimate whether the movement of the user is walking or running based on acceleration detected by the acceleration sensor; estimation method selection processing to select one from among a plurality of direction estimation methods for estimating a traveling direction that indicates traveling in a forward direction or backward direction relative to an orientation of a body of the user, based on estimation results by way of the movement estimation processing; and direction estimation processing to estimate the traveling direction of the user by way of the direction estimation method selected according to the estimation method selection processing.

2. The information processing device according to claim 1, wherein the acceleration sensor detects accelerations of a vertical direction component and a horizontal direction component relative to a main body of the acceleration sensor.

3. The information processing device according to claim 2, wherein the processing unit executes, as the movement estimation processing that:
   estimates that the user is running in a case of, for respective accelerations of the vertical direction component and the horizontal direction component detected, a magnitude of each of the accelerations being at least an acceleration threshold for running determination, and a pitch indicated by a time interval between peaks of each of the accelerations being no more than a peak threshold for running determination; and
   estimates that the user is walking in a case of the magnitude of each of the accelerations of the vertical direction component and the horizontal direction component being less than the acceleration threshold for running determination, or a pitch indicated by a time interval between peaks of each of the accelerations being less than the pitch threshold for running determination.

4. The information processing device according to claim 2, wherein the processing unit executes, as the direction estimation processing, processing that:
   in a case of the movement estimation processing determining the movement of the user as being walking, estimates as the traveling direction of the user a direction indicated by an extreme value that is the second closest in a future direction on the time axis, or closest in a past direction on the time axis, among extreme values for the horizontal direction component of acceleration detected by the acceleration sensor, relative to a timing indicating an extreme value of acceleration in an upward direction for the vertical direction component of acceleration detected by the acceleration sensor; and
   in a case of the movement estimation processing determining the movement of the user as being running, estimates as the traveling direction of the user a direction indicated by an extreme value belonging to a time period of the same half-cycle as an extreme value in the upward direction for the vertical component of the acceleration, among extreme values for the horizontal component of acceleration acquired by the acceleration sensor, relative to a timing indicating an extreme value in the upward direction for the vertical component of acceleration acquired by the acceleration sensor.

5. The information processing device according to claim 1, wherein the processing unit further executes:
   in a case of the movement estimation processing estimating the movement of the user as walking, filter processing for walking that applies a filter for walking, which allows a frequency band corresponding to when walking to pass, to a waveform of acceleration acquired by the acceleration sensor; and
   in a case of the movement estimation processing estimating the movement of the user as running, filter processing for running that applies a filter for running, which allows a frequency band corresponding to when running to pass, to the waveform of acceleration acquired by the acceleration sensor,
   wherein the movement estimation processing estimates whether the movement of the user is walking or running based on a waveform of the acceleration produced by executing the filter processing for walking or the filter processing for running.

6. The information processing device according to claim 1, wherein the movement estimation processing executes, on the waveform of the acceleration detected by the acceleration sensor, filter processing for walking that allows a frequency band corresponding to when walking to pass and filter processing for running that allows a frequency band corresponding to when running to pass; and estimates, as the movement of the user, movement that corresponds to a filter having a clearer extreme value in processing results of the filter processing for walking and the filter processing for running.

7. The information processing device according to claim 1,
   wherein the processing unit further executes, on the waveform of acceleration acquired by the acceleration sensor, common filter processing that allows a frequency band corresponding to when walking and a frequency band corresponding to when running to pass, and
   wherein the movement estimation processing estimates whether the movement of the user is walking or running based on a waveform of the acceleration produced by executing the common filter processing.

8. The information processing device according to claim 2, wherein the processing unit further executes current position calculation processing that calculates a current position based on estimation results of the traveling direction according to the direction estimation processing, and the horizontal direction component of acceleration detected.

9. The information processing device according to claim 8, wherein the information processing device further comprises a map data storage unit that stores map data, and
   wherein the processing unit further executes display control processing that references the map data stored in the map data storage unit and displays a map on a display unit, and displays a current position calculated by way of the current position calculation processing on the map being displayed.

10. The information processing device according to claim 1, wherein the processing unit further executes vertical direction estimation processing that calculates, for the vertical direction component of acceleration detected by the acceleration sensor, an average value of the vertical direction component of acceleration detected by the acceleration sensor for a time period set in advance.

11. A traveling direction estimation method to be executed by an information processing device including an acceleration sensor that detects acceleration generated by movement of a user and a processing unit,
   the method comprising the steps of the processing unit:
   estimating movement of the user as walking or running based on acceleration detected by the acceleration sensor;
   selecting one from among a plurality of direction estimation methods for estimating a traveling direction indicating traveling in a forward direction or a backward direction relative to the orientation of a body of the user, based on results of estimating movement; and
   estimating a traveling direction of the user by way of the direction estimation method selected.

12. A storage medium that is readable by a computer used as an information processing device that includes an acceleration sensor for detecting acceleration generated by movement of a user, the storage medium being encoded with a program for enabling the computer to execute the steps of:

estimating whether the movement of the user is walking or running, based on acceleration detected by the acceleration sensor;

selecting one from among a plurality of direction estimation methods for estimating a traveling direction that indicates traveling in a forward direction or a backward direction relative to the orientation of a body of the user, based on estimation results of the step of estimating movement; and estimating the traveling direction of the user by way of the direction estimation method selected in the step of selecting.

13. An information processing device comprising:

an acceleration sensor that detects acceleration generated by movement of a user;

a geomagnetic sensor that detects an azimuth; and a processing unit that executes: movement estimation processing that estimates the movement of the user as walking or running based on acceleration detected by the acceleration sensor; estimation method selection processing that selects one from among a plurality of direction estimation methods for estimating the traveling direction of the user, based on estimation results according to the movement estimation processing;

direction estimation processing that estimates the traveling direction of the user by way of the direction estimation method selected according to the estimation method selection processing; and traveling azimuth determination processing that determines a traveling azimuth of the user based on the traveling direction of the user estimated and the azimuth detected by the geomagnetic sensor.

* * * * *